United States Patent
Pei et al.

(10) Patent No.: US 11,898,414 B2
(45) Date of Patent: Feb. 13, 2024

(54) METHOD FOR FILLING OIL-GAS WELL OF FRACTURED OIL-GAS RESERVOIR WITH ISOLATION PARTICLES TO REDUCE WATER AND INCREASE OIL PRODUCTION

(71) Applicant: ANTON BAILIN OILFIELD TECHNOLOGY (BEIJING) CO., LTD, Beijing (CN)

(72) Inventors: Bailin Pei, Beijing (CN); Songmei Zhang, Beijing (CN); Guojiang Feng, Beijing (CN); Hailong Wang, Beijing (CN)

(73) Assignee: ANTON BAILIN OILFIELD TECHNOLOGY (BEIJING) CO., LTD, Beijing (CN)

( * ) Notice: Subject to any disclaimer, the term of this patent is extended or adjusted under 35 U.S.C. 154(b) by 33 days.

(21) Appl. No.: 17/427,068

(22) PCT Filed: Dec. 10, 2019

(86) PCT No.: PCT/CN2019/124222
§ 371 (c)(1),
(2) Date: Jul. 29, 2021

(87) PCT Pub. No.: WO2020/155861
PCT Pub. Date: Aug. 6, 2020

(65) Prior Publication Data
US 2022/0098955 A1 Mar. 31, 2022

(30) Foreign Application Priority Data
Jan. 29, 2019 (CN) .......................... 201910084658.8

(51) Int. Cl.
*E21B 33/13* (2006.01)
*C09K 8/50* (2006.01)
(Continued)

(52) U.S. Cl.
CPC ................ *E21B 33/13* (2013.01); *C09K 8/50* (2013.01); *E21B 43/16* (2013.01); *E21B 43/26* (2013.01); *E21B 47/06* (2013.01)

(58) Field of Classification Search
CPC ........ E21B 43/26; E21B 43/267; E21B 43/04; E21B 33/13; E21B 43/08; E21B 43/086;
(Continued)

(56) References Cited

U.S. PATENT DOCUMENTS

| 9,080,426 B2 | 7/2015 | Pei et al. |
| 2011/0303411 A1 | 12/2011 | Todd et al. |
| 2018/0163120 A1 | 6/2018 | Ravn |

FOREIGN PATENT DOCUMENTS

| CA | 2808468 A1 * | 9/2013 | ............. E21B 43/26 |
| CN | 1594827 A | 3/2005 | |

(Continued)

OTHER PUBLICATIONS

International Application No. PCT/CN2019/124222, International Search Report, dated Mar. 13, 2020.
(Continued)

*Primary Examiner* — Zakiya W Bates
(74) *Attorney, Agent, or Firm* — MARSHALL, GERSTEIN & BORUN LLP

(57) ABSTRACT

A method for filling an oil and gas well of a fractured oil and gas reservoir with pack-off particles to reduce water and increase oil production comprises the following steps: (1) injecting a filling liquid carrying pack-off particles into a wellbore and a fracture via a wellhead, until a stratum crack/fracture extension pressure is reached or exceeded, or until an injection amount per unit injection pressure is close to zero, or until a preset filling amount of pack-off particles is reached; (2) launching production.

10 Claims, 2 Drawing Sheets

(51) Int. Cl.
*E21B 43/16* (2006.01)
*E21B 47/06* (2012.01)
*E21B 43/26* (2006.01)

(58) Field of Classification Search
CPC ........ E21B 43/10; E21B 43/16; E21B 43/082; E21B 43/084; E21B 43/088; E21B 23/06; E21B 33/12
See application file for complete search history.

(56) References Cited

FOREIGN PATENT DOCUMENTS

| | | | |
|---|---|---|---|
| CN | 102604605 A | 7/2012 | |
| CN | 103015945 A | 4/2013 | |
| CN | 103509537 A | 1/2014 | |
| CN | 103788935 A | 5/2014 | |
| CN | 107664020 A | 2/2018 | |
| CN | 207122305 U | 3/2018 | |
| CN | 108040483 A | 5/2018 | |
| CN | 108442895 A | 8/2018 | |
| CN | 109653707 A | 4/2019 | |
| WO | WO-2011/069339 A1 | 6/2011 | |
| WO | WO-2014065962 A1 * | 5/2014 | ............. E21B 23/06 |

OTHER PUBLICATIONS

Chinese Patent Application No. 201910084658, First Office Action, dated Mar. 4, 2020.
Chinese Patent Application No. 201910084658, Second Office Action, dated Jan. 7, 2021.
Saudi Arabia patent application No. 521422597, Office Action, dated Sep. 28, 2023.

* cited by examiner

METHOD FOR FILLING OIL-GAS WELL OF FRACTURED OIL-GAS RESERVOIR WITH ISOLATION PARTICLES TO REDUCE WATER AND INCREASE OIL PRODUCTION

CROSS-REFERENCE TO RELATED APPLICATIONS

This application is the U.S. national phase of PCT Application No. PCT/CN2019/124222, filed on Dec. 10, 2019, which claims priority to Chinese Application No. 201910084658.8, filed Jan. 29, 2019, the entire disclosures of which are hereby incorporated by reference in their entirety.

TECHNICAL FIELD

The present invention pertains to a technical field of oil-gas well exploitation, and is related to a method for exploiting an oil-gas well of a fractured oil-gas reservoir, and particularly to a method for filling an oil-gas well of a fractured oil-gas reservoir with blocker particles to reduce water and increase oil production.

BACKGROUND

Fractured oil-gas reservoirs are widespread, and account for about half of the existing oil-gas reservoirs. Water flooding exploitation are mostly adopted in fractured oil-gas reservoirs, including bottom water flooding, side water flooding, injection water flooding in a water injection well and the like. Due to the existence of fractures, channeling flow of water in the water flooding exploitation process is large, so that occurrence of water in an oil-gas well is brought forward, rendering water content of the oil well very high and oil production greatly reduced. Actual production processes show that the larger the fracture spreading scale is, the stronger the channeling capacity is. Highly angled fractures can more easily cause bottom water to channel to the production well. For example, although a certain horizontal well has an oil layer with a thickness up to tens of meters, water content of the oil well reaches up to 50% on the first day of production due to the existence of fractures. Fractures of long horizontal distances tend to cause side water and injection water of the water injection well to channel to the production well. For example, an oil reservoir has a water injection well and a production well spaced apart by 700 meters, and it takes only 7 days for water to channel from the water injection well to the production well. Reasons for a large number of fractures in the oil-gas reservoirs include two aspects, one is tearing, shearing and other movements of the oil-gas reservoir and the surrounding stratum under crustal stress, resulting in fractures with relatively larger fracture area; the other is the dissolution which causes width of the fracture further increased. Due to dissolution fissures and dissolution channels, the fractures have strong flow conductivity even if there are pressures from the overlying stratum.

Practice has shown that fractures exist in oil-gas wells in a variety of structural patterns: some fractures are completely opened (namely, opened fractures) at the well wall with relatively larger opening degree; some fractures have two side surfaces thereof partially in contact with each other so that the opening degree is very small; some fractures have the opening almost completely closed at the well wall under the stratum pressure, but there is still possibility for this type of fractures to open under pressure within the well (i.e., unopened fractures); also, there are some opened fractures which are blocked by drilling mud or coarse drilling rock debris, so that the openings are closed.

One of the problems that fractures cause during oil-gas production is that the water content of the produced liquid is very high. This is because, on the one hand, the fractures have extremely strong flow conductivity, for example, the flow conductivity of a 1 mm wide fracture is equivalent to the flow conductivity of a production section of a well with a length of 400 m and a matrix permeability of 0.2 Darcy; on the other hand, oil in the fractures is replaced by water shortly after production, so that water egress from the fractures is further increased due to large oil-water viscosity ratio, for example, the viscosity of water is usually smaller than 0.8 mPa·s under reservoir conditions, while the viscosity of oil is usually tens of mPa·s, with an oil-water viscosity ratio of more than ten and even up to hundreds. If technical measures are not adopted for control, the water content of the fractured oil-gas reservoirs can reach more than 90%, so that the oil production is greatly reduced. Another problem that fractures cause during oil-gas production is the reduced recovery efficiency of the reservoir matrix. The reason is that due to the presence of the fractures, pressure gradient within the section having fractures is very low, which in turn results in a very low matrix pressure gradient around the fractures, thereby resulting in a very low recovery efficiency of the oil-gas well; this phenomenon occurs not only in opened fractures but also in unopened fractures.

In conclusion, in the process of exploiting a fractured oil-gas reservoir, special technical measures must be taken to block the fractures of the production section so as to control the water and increase the oil. The prior arts comprise gel blocking method, chemical reagent blocking method and the like. The gel blocking method is most widely used, but it is difficult to determine a proper gel strength in practical applications, and if the gel strength is too high, it is difficult to inject the gel into the fractures; on the contrary, if the strength is too low, the gel tends to be exploited out in the production process, rendering the blocking noneffective. The gel blocking method and the chemical agent blocking method can adopt a thickening agent and the like as a blocking medium, but are influenced by severe environments such as underground high temperature, high salinity and the like, and the blocking medium tends to degrade and lose efficacy, and the service life of the blocking medium hardly exceeds 3 months. WO2011/069339 discloses a technical solution of preventing channeling of a production section of an oil-gas well by means of blocker particles, but the present invention does not directly give a technical suggestion that the blocker particles can be applied to an oil-gas well of a fractured oil-gas reservoir to block fractures of a wellbore of the production section of the oil-gas well. For the reasons above, the water egress problem of the oil-gas well of the fractured oil-gas reservoir is not effectively solved so far.

SUMMARY

The present invention aims to overcome the defects of the prior art and provides a method for filling an oil-gas well of a fractured oil-gas reservoir with blocker particles to reduce water and increase oil production, which is simple and easy in operation process and has a good effect in blocking fractures, a long duration and a high input-output ratio.

In order to realize the above purposes, the present invention adopts the following technical solutions:

A method for filling an oil-gas well of a fractured oil-gas reservoir with blocker particles to reduce water and increase oil production comprising the following steps: (a1) injecting a filling liquid carrying blocker particles into a wellbore and a fracture via a wellhead, until a stratum crack/fracture extension pressure is reached or exceeded, or until an injection amount per unit injection pressure is close to zero, or until a preset filling amount of blocker particles is reached; (a2) launching production.

Preferably, in the step (a2), before launching production, the method further comprises the following steps: deploying a flushing tube and completely discharging the blocker particles in the wellbore.

Preferably, a method for measuring the stratum crack/fracture extension pressure comprises the following steps: (s1) continuously injecting filling liquid into the wellbore via the wellhead, gradually increasing the injection rate; (s2) continuously measuring the pressure in the well until the pressure in the well experiences a rapid drop; (s3) the highest pressure value before the rapid drop occurs is the stratum crack/fracture extension pressure in the well.

Preferably, the preset filling amount of blocker particles is determined by: $V \geq \rho \cdot L_0$; wherein V is the preset filling amount of blocker particles, $L_0$ is a total length of the wellbore of the production section; and $\rho$ is a filling density, when the oil-gas well is a horizontal well, $\rho$ has a value of 0.01-1.0 $m^3$/m, and when the oil-gas well is a vertical well, $\rho$ has a value of 0.01-5.0 $m^3$/m.

Preferably, a particle size of the blocker particles is 0.05-5 mm.

Preferably, a density of the blocker particles is 0.7-1.4 gram/$cm^3$ (true density).

Preferably, the density of the blocker particles is 0.9-1.08 gram/$cm^3$ (true density).

Preferably, the blocker particles are made of polyethylene, high-density polyethylene, polypropylene, polyvinyl chloride or styrene divinylbenzene crosslinked copolymer.

Preferably, the blocker particles are of a spherical structure.

Preferably, a concentration of the blocker particles in the filling liquid is 1-20% (by volume).

In order to realize the above purposes, the present invention further adopts the following technical solutions:

A method for filling an oil-gas well of a fractured oil-gas reservoir with blocker particles to reduce water and increase oil production, the oil-gas well having a wellbore within which a sieve tube is provided, wherein a packing device is provided at the top of the sieve tube, and the packing device is provided with a filling channel for injecting filling liquid, wherein the method comprises the following steps: (b1) continuously injecting a filling liquid carrying blocker particles into an annular space and a fracture via the filling channel provided on the packing device, until a stratum crack/fracture extension pressure is reached or exceeded, or until an injection amount per unit injection pressure is close to zero, or until a preset filling amount of blocker particles is reached; (b2) reducing an injection rate of the filling liquid, and allowing a filling pressure to be smaller than the stratum crack/fracture extension pressure, continuously injecting the filling liquid carrying blocker particles until the annular space is fully filled with the blocker particles or the preset filling amount of blocker particles is reached; (b3) closing the filling channel and launching production.

Preferably, the sieve tube is a water control sieve tube.

Preferably, the injection rate of the filling liquid in the step (b2) is smaller than a liquid producing rate after the production is launched.

Preferably, a method for measuring the stratum crack/fracture extension pressure comprises the following steps: (s1) continuously injecting filling liquid into the wellbore via the wellhead, gradually increasing the injection rate; (s2) continuously measuring the pressure in the well until the pressure in the well experiences a rapid drop; (s3) the highest pressure value before the rapid drop occurs is the stratum crack/fracture extension pressure.

Preferably, the preset filling amount of blocker particles is determined by: $V \geq \rho \cdot L_0$; wherein V is the preset filling amount of blocker particles, $L_0$ is a total length of the wellbore of the production section; and $\rho$ is a filling density, when the oil-gas well is a horizontal well, $\rho$ has a value of 0.01-1.0 $m^3$/m, and when the oil-gas well is a vertical well, $\rho$ has a value of 0.01-5.0 $m^3$/m.

Preferably, full filling of the blocker particles in the annular space can be determined as follows: when the filling liquid is injected at a constant rate, continuously measuring the pressure in the well until the pressure in the well increases to a set pressure, then determining that the annular space is fully filled with the blocker particles; or when the filling liquid is injected at a constant pressure, continuously measuring the flow rate of the filling liquid until the flow rate decreases to a set flow rate, then determining that the annular space is fully filled with the blocker particles.

Preferably, the blocker particles are of a spherical structure, and a particle size of the blocker particles is 0.05-5 mm.

Preferably, a density of the blocker particles is 0.7-1.4 gram/$cm^3$ (true density).

Preferably, the density of the blocker particles is 0.9-1.08 gram/$cm^3$ (true density).

Preferably, the blocker particles are made of polyethylene, high-density polyethylene, polypropylene, polyvinyl chloride or styrene divinylbenzene crosslinked copolymer.

Preferably, a concentration of the blocker particles in the filling liquid is 1-20% (by volume).

In order to realize the above purposes, the present invention further adopts the following technical solutions:

A method for filling an oil-gas well of a fractured oil-gas reservoir with blocker particles to reduce water and increase oil production, the oil-gas well including one or more production wells and one or more water injection wells cooperating with the production wells, wherein the method comprises the following steps: (c1) injecting a filling liquid carrying blocker particles into a wellbore of a water injection well and a fracture via a wellhead of the water injection well until a preset filling amount of blocker particles is reached; (c2) launching production of the production well or starting normal production.

Preferably, the production well is provided with a sieve tube or a water control sieve tube.

Preferably, the blocker particles are of a spherical structure, and a particle size of the blocker particles is 0.05-5 mm.

Preferably, a density of the blocker particles is 0.7-1.4 gram/$cm^3$ (true density).

Preferably, the density of the blocker particles is 0.9-1.08 gram/$cm^3$ (true density).

Preferably, the blocker particles are made of polyethylene, high-density polyethylene, polypropylene, polyvinyl chloride or styrene divinylbenzene crosslinked copolymer.

Preferably, a concentration of the blocker particles in the filling liquid is 1-20% (by volume).

In order to realize the above purposes, the present invention further adopts the following technical solutions:

A method for filling an oil-gas well of a fractured oil-gas reservoir with blocker particles to reduce water and increase oil production, comprising the following steps: (d1) injecting a filling liquid carrying blocker particles into a wellbore and a fracture via a wellhead; (d2) launching production. An injection rate of the filling liquid in the step (d1) is smaller than a liquid producing rate after the production is launched in the step (d2).

Preferably, the step (d2) further comprises the following step before launching the production: extracting liquid from the wellbore by a pump disposed in the wellbore, wherein a rate at which the liquid is extracted by the pump is greater than an injection rate of the filling liquid.

Preferably, a volume of the liquid being extracted in the wellbore is greater than a volume of the filling liquid being injected.

Preferably, the step (d2) further comprises the following step before launching the production: producing the liquid in the wellbore by an artificial lifting method, wherein a liquid producing rate is greater than an injection rate of the filling liquid.

Preferably, a volume of the liquid being produced in the wellbore is greater than a volume of the filling liquid being injected.

Preferably, in the step (d1), a volume of the blocker particles being injected is 1 to 12 times as big as that of an annular volume.

Preferably, a sieve tube or a water control sieve tube is provided in the wellbore, a packing device is provided at the top of the sieve tube, the packing device is provided with a filling channel for injecting filling liquid, and the filling liquid is injected into the annular space and the fracture through the filling channel provided on the packing device.

Preferably, a particle size of the blocker particles is 0.05-5 mm.

Preferably, a density of the blocker particles is 0.7-1.4 gram/cm$^3$ (true density).

Preferably, the blocker particles are made of polyethylene, high-density polyethylene, polypropylene, polyvinyl chloride or styrene divinylbenzene crosslinked copolymer.

Preferably, the blocker particles are of a spherical structure.

Preferably, a concentration of the blocker particles in the filling liquid is 1-20% (by volume).

The present invention relates to a method for filling an oil-gas well of a fractured oil-gas reservoir with blocker particles to reduce water and increase oil production, which can efficiently address the problem of water channeling and water production existing in various fractures, by direct filling and recovery filling of the fractures with blocker particles, directly filling of the annular space, back flowing of the blocker particles in the fractures from the fractures to the annular space, and filling from the water injection well to the production well. In particular, by utilizing two-pressure staged pressurizing filling and recovery filling, the blocker particles smoothly enter narrowly opened fractures and unopened fractures, so that the blocking effect of the fractures is effectively improved, the flow conductivity of various fractures is reduced, and the water production of the well is reduced; meanwhile, the pressure gradient during the production of the matrix is further improved, the utilization degree of the matrix oil gas is improved, and the recovery ratio is improved.

Figure 1:
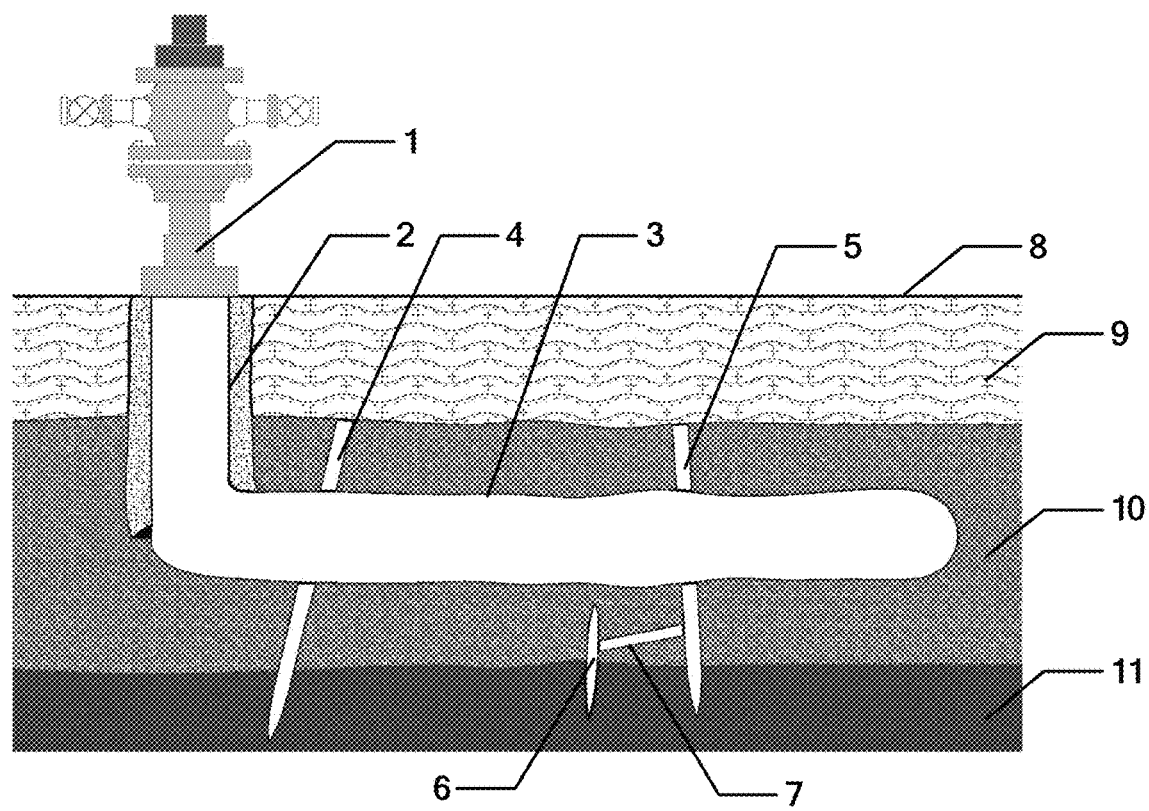
FIG. 1 is a structural schematic illustration of an oil-gas well of a fractured oil-gas reservoir.

List of reference numerals: 1—Christmas tree, 2—oil well casing, 3—well wall of a production section, 4—fracture A, 5—fracture B, 6—unopened fracture C, 7—near horizontal fracture D, 8—ground, 9—overlying stratum, 10—oil zone (fractured oil-gas reservoir), 11—bottom water, 12—blocker particles, 13—packing device, 14—annular space, 15—sieve tube, 16—water control sieve tube.

DETAILED DESCRIPTION

The following descriptions will further describe specific implementations of the method for filling an oil-gas well of a fractured oil-gas reservoir with blocker particles to reduce water and increase oil production in combination with FIGS. 1 to 4. The method for filling an oil-gas well of a fractured oil-gas reservoir with blocker particles to reduce water and increase oil production in accordance with the present invention is not limited to the descriptions of the following embodiments.

The terms used in the present invention are defined as follows: "sieve tube" is also known in the industry as downhole filter, or sand blocking tube; "water control sieve tube" is also known in the industry as downhole flow control filter, or flow control sand blocking tube, flow control sieve tube or water control sand blocking tube; compared with oil, the water control sieve tube with additional flow resistance for water is called AICD, and the water control sieve tube without additional flow resistance for water is called ICD, and both the AICD and the ICD belong to the concept of water control sieve tube; "annular space" refers to an annular space between the sieve tube (or the water control sieve tube) and the well wall. In the present invention, both ends of the sieve tube (or water control sieve tube) have closed structures, for example, both ends are closed by using parts such as plugs; the filling pressure, the pressure in the well, the stratum crack/fracture extension pressure and the like refer to the pressure converted into the stratum; the density or volume of the blocker particles refers to true density or volume but not to bulk density or volume; the filling rate of the filling liquid, the liquid producing rate, and the rate of liquid removal from the wellbore by pumping as described herein refer to a volume of filling liquid flowing via the wellhead per unit time; the technology for controlling water by continuous blocker in the wellbore is a technology for controlling water by the combined action of a water control sieve tube in the wellbore and continuous blocker in the annular space.

As shown in FIG. 1, a conventional oil-gas well of a fractured oil-gas reservoir is shown. The oil zone 10 is a fractured oil-gas reservoir and has a complex structure of fractures. Specifically, a fracture A and a fracture B directly communicate between the bottom water and a wellbore production section. An opening width of the fracture A is smaller than a particle size (particle diameter) of the blocker particles, an opening width of the fracture B is larger than the particle size of the blocker particles, and the fracture C is a unopened fracture and is communicated with the fracture B via a near horizontal fracture D.

Embodiment 1

The embodiment provides a method for filling an oil-gas well of a fractured oil-gas reservoir with blocker particles to reduce water and increase oil production. The method directly fills blocker particles into a wellbore and a fracture to block the fracture, and specifically comprises the following steps: (a1) injecting a filling liquid carrying blocker particles into a wellbore and a fracture via a wellhead; until a stratum crack/fracture extension pressure is reached or exceeded, or until an injection amount per unit injection pressure is close to zero, or until a preset filling amount of blocker particles is reached; (a2.1) deploying a flushing tube and completely discharging the blocker particles in the wellbore; and (a2.2) launching production.

In the above step (a1), there are three criteria for terminating injection of the injected filling liquid, which correspond to production section wellbores with different structures and different fractures respectively. In practical applications, the filling of the filling liquid can be terminated if any of the three criteria is met. Specifically, in a first instance, in case that the fracture is filled at a steady rate (but not limited to a "constant rate", as the rate may vary slowly in a certain range), if the fracture, i.e., the annular space, is fully filled with blocker particles and blocking of the fracture can be achieved, the pressure is gradually increased until the stratum crack/fracture extension pressure is reached or exceeded, then the criterion for terminating the filling is reached. In a second instance, in case that the filling liquid is injected continuously at a constant pressure, if the fracture, i.e. the annular space, is fully filled with the blocker particles and a complete or nearly complete blocking of the fracture can be achieved, the injection flow per unit injection pressure will gradually decrease until it is close to zero or approaches a small value and remains constant (e.g. smaller than one fifth or one tenth of the initial injection pressure), then the criterion for terminating the filling is reached. In a third instance, if the stratum crack/fracture extension pressure is not reached or exceeded after a preset blocker particles have been completely filled, and the injection amount per unit injection pressure is still large or is not significantly reduced, then there exists a large fracture which cannot be directly blocked, and the fracture can be blocked by means of recovery filling as described below.

In the above step (a1), it is the most effective filling method to inject the filling liquid at a steady rate until its final pressure (or termination pressure) is equal to or greater than the stratum crack/fracture extension pressure; more preferably, the filling may be continued for a period of time after the filling pressure reaches or exceeds the stratum crack/fracture extension pressure, so that the blocker particles adequately enter the fracture. The reason is that the stratum crack/fracture extension pressure is the expansion pressure of the initial fracture, and on one hand, the pressure can further increase the opening of the fracture, so that more blocker particles can be injected into the fracture, and a better blocking effect can be achieved (for example, the initial fracture has a width of only 0.3 mm, and the fracture is slightly expanded by increasing the filling pressure, so that a large amount of blocker particles having a particle size of 0.5 mm can enter the fracture); on the other hand, under the action of the pressure, some unopened fractures can be opened, allowing blocker particles to enter the fractures, so that the unopened fractures are blocked.

Specifically, evaluation of the stratum crack/fracture extension pressure needs to be carried out in advance, and the measuring method thereof comprises the following steps: (s1) connecting a pressure gauge and a flowmeter at the wellhead, continuously injecting filling liquid (filling liquid without blocker particles) into the wellbore via the wellhead, gradually increasing the injection rate, and continuously increasing the pressure in the well; (s2) continuously measuring the pressure in the well until the pressure in the well experiences a rapid drop, wherein the drop has a large and significant cliff-type fall and is easy to identify; the reason for the fall is that the stratum or the fracture communicated with the wellbore is propped open by pressure, so that suction capacity of the stratum is significantly increased and the filling liquid in the wellbore is quickly lost; that is, the pressure may break the stratum and may break the fracture and extend the fracture; (s3) the highest pressure value before the rapid drop occurs is the stratum crack/fracture extension pressure.

In the above step (a1), the blocker particles with matching particle size can be selected for blocking, in accordance with the fracture opening degree. However, for some fractures with large opening, with large fracture space volume, connected with unopened fracture and near horizontal fracture or directly connected with bottom water, the injected blocker particles may leak, so that the fractures are difficult to be completely blocked, and the pressure in the well is difficult to reach the stratum crack/fracture extension pressure, and then "reaching the preset filling amount of blocker particles" can be deemed as a symbol for terminating the filling.

Figure 2:
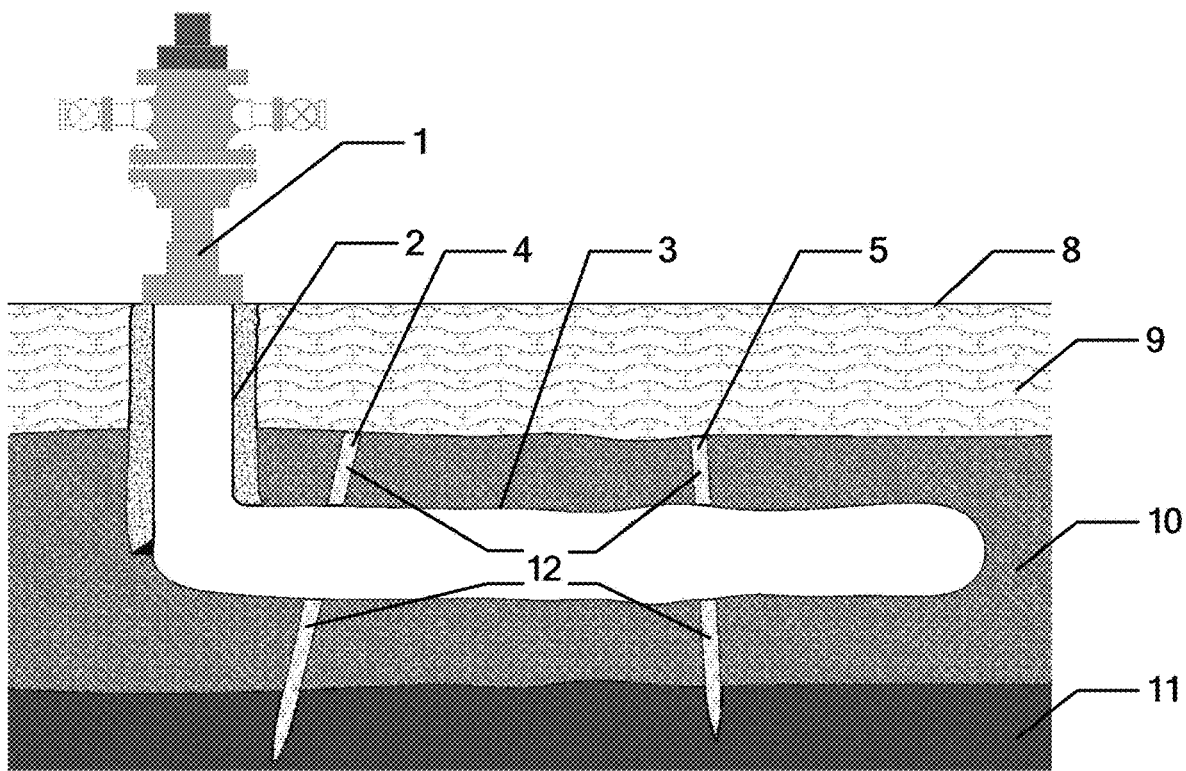
FIG. 2 is a structural schematic illustration of the oil-gas well of the fractured oil-gas reservoir shown in FIG. 1 after its fractures are filled by the method for filling an oil-gas well of a fractured oil-gas reservoir with blocker particles to reduce water and increase oil production described in embodiment 1.

After filling is finished, the step (a2.1) is carried out, completely returning the blocker particles in the wellbore, and recovering the returned blocker particles. At this time, the pressure in the well is reduced, the opening of the fracture is reduced, and blocker particles in the fracture can induce a "recovery filling" phenomenon, that is, the blocker particles in the fracture reversely move towards the wellbore of the production section along the movement direction of the fluid (obviously, after the filling pressure is removed and the production is launched, the "recovery filling" phenomenon is more apparent). However, as the opening degree of the fracture is reduced, part of the blocker particles still can be blocked and remained in the fracture, and the fracture is blocked. As shown in FIG. 2, after the step (a2.1) is finished, both the fracture A and the fracture B are blocked by the blocker particles; preferably, even the near horizontal fracture D and the open fracture C (not shown in FIGS. 2 to 4) can be blocked using the method of the present invention. In the production process of the following step (a2.2), because the fracture is effectively blocked by the blocker particles, the water content of the produced liquid can be significantly reduced, and the production efficiency can be significantly improved.

In the method, the preset filling amount of blocker particles in the step (a1) can be determined by: $V \geq \rho \cdot L_0$, wherein V is the preset filling amount of blocker particles, $L_0$ is the total length of the wellbore of the production section; and $\rho$ is the filling density which refers to a filling volume of blocker particles in a wellbore of a production section per unit length. When the oil-gas well is a horizontal well, $\rho$ has a value of 0.01-1.0 $m^3/m$. When the oil-gas well is a vertical well, $\rho$ has a value of 0.01-5.0 $m^3/m$. During practical construction, a proper value for the filling amount of blocker particles can be preset according to actual size of a fracture and development of the fracture under pressure. As a specific embodiment, the blocker particles are preferably of a spherical structure so as to have a good flowability; of course, other-shaped structures such as pyramids, squares, dodecahedrons, etc. having a particle size (i.e., the largest dimension in various directions) of 0.05-5 mm may be used. The blocker particles are made of polyethylene, high-density polyethylene, polypropylene, polyvinyl chloride or styrene divinylbenzene crosslinked copolymer, with a density of 0.7-1.4 gram/cm$^3$, and more preferably 0.9-1.08 gram/cm$^3$. The blocker particles should be selected to have a smooth surface to improve flowability. The concentration of the blocker particles in the filling liquid is 1-20% (by volume), and the filling liquid should has a good lubricity. With the above mentioned blocker particles and filling liquid, the blocker particles can flow into the fractures along with the filling liquid more easily.

Embodiment 2

Embodiment 2 is a further optimization of embodiment 1. According to the technical solution of embodiment 1, after production of the oil-gas well is launched, because the fluid in the fractures flows from the fracture to the wellbore, the fluid can drive part of the particles to be recovered to the wellbore and be expelled, thereby resulting in the following problems: firstly, after the blocker particles in part of the fractures are recovered, the filling degree of the blocker particles in the fractures is reduced, and the capability of controlling water and blocking the flow of water is reduced; especially for wider dissolutional fractures, a great amount of blocker particles entering the fractures can be recovered into the wellbore after the production is launched, so that the fracture blocking and water control effects cannot be maintained; secondly, the expelling of the blocker particles can cause certain influences on the operation of the downhole electric pump, for example, risking pump blockage; thirdly, the blocker particles may enter the infusion tubing to deposit, risking adverse influence on infusion.

Figure 3:
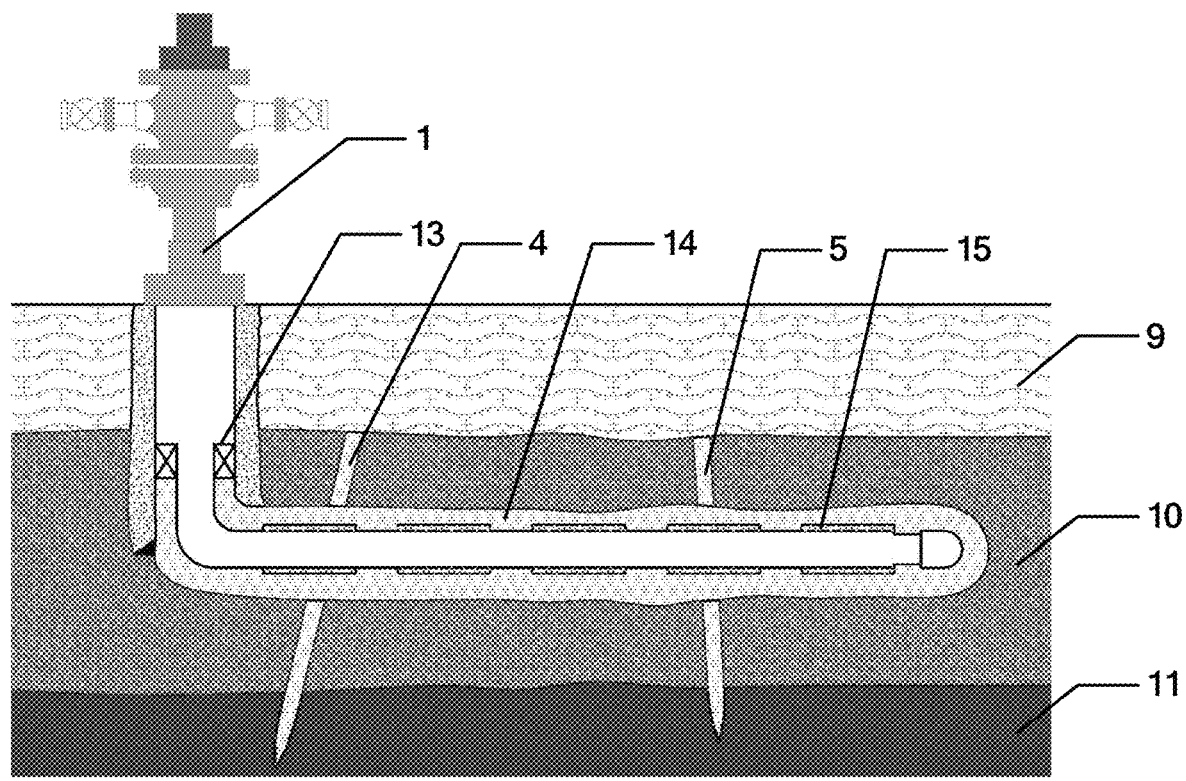
FIG. 3 is a structural schematic illustration of the oil-gas well of the fractured oil-gas reservoir shown in FIG. 1 after its fractures and annular space are filled by the method for filling an oil-gas well of a fractured oil-gas reservoir with blocker particles to reduce water and increase oil production described in embodiment 2.

In this regard, embodiment 2 proposes installing a sand prevention string in an oil-gas well in advance to solve the above problems. Specifically, as shown in FIG. 3, the sand prevention string comprises a sieve tube, wherein a packing device is provided at the top of the sieve tube (i.e. the end adjacent the wellhead), and the packing device is provided with a filling channel for injecting filling liquid; the other end of the sieve tube is closed by components such as a plug and the like. For more details, reference may be made to the technical solution disclosed in the Chinese utility model "An oil-gas well completion structure capable of improving capacity of reducing water and increasing oil production (201621200386.1)".

The method for filling an oil-gas well of a fractured oil-gas reservoir with blocker particles to reduce water and increase oil production in accordance with the present embodiment comprises the following steps: (b1) opening a filling channel provided on the packing device, and continuously injecting a filling liquid carrying blocker particles into the annular space and the fracture via the filling channel; until the stratum crack/fracture extension pressure is reached or exceeded, or the preset filling amount of blocker particles is reached; (b2) reducing an injection rate of the filling liquid, allowing the injection rate of the filling liquid to be smaller than the liquid producing rate after the production is launched, and allowing a filling pressure to be smaller than the stratum crack/fracture extension pressure, continuously injecting the filling liquid carrying blocker particles until the annular space is fully filled with the blocker particles or the preset filling amount of blocker particles is reached; (b3) closing the filling channel and launching production.

The steps (b1) and (b2) may be defined as a first stage of filling and a second stage of filling, respectively. The first stage of filling is carried out at a filling pressure greater than the stratum crack/fracture extension pressure (i.e., the expansion pressure of the initial fracture), primarily aiming at expanding the fracture as much as possible to facilitate entry of blocker particles into the fracture; the second stage of filling is carried out at a filling pressure smaller than the expansion pressure of the initial fracture, primarily aiming at filling the relatively larger fractures and the annular space. By fully filling the annular space with the blocker particles during the second stage, not only the recovery phenomenon of the blocker particles in the fractures during the production process can be inhibited, but also the production process can have a recovery filling function (when a recovery phenomenon occurs, the blocker particles in the fractures move in a reverse direction under the driving of fluid, but are blocked by the blocker particles in the annular space and cannot enter the annular space, thereby accumulating in the fractures adjacent to the annular space, and therefore a better blocking effect can be achieved), so that the water control performance can be better. The reason for using two-stage filling is that: firstly, the fractures need to be filled with a relatively large amount of blocker particles in the filling process, but cannot be filled in an infinite manner, otherwise, the cost is too high and the operation time is too long; secondly, the particle size of the blocker particles filled in the fracture and the particle size of the blocker particles filled in the annular space should satisfy different requirements; thirdly, the material of the blocker particles for filling the fracture and the material of the blocker particles for filling the annular space should satisfy different requirements. It should be noted that the above-mentioned "two-stage filling" is not to be narrowly interpreted as "twice filling", but can mean that a plurality of times of filling can be carried out at a plurality of pressures in each stage. For example, it is within the scope of the method of the present invention to carry out a total of M+N times of filling (M, N are both natural numbers), wherein the filling pressure of the first M times is greater than the stratum crack/fracture extension pressure, and the filling pressure of the last N times is smaller than the stratum crack/fracture extension pressure.

In the step (b2), the filling rate of the filling liquid is set to be smaller than the liquid producing rate after the production is launched, the purpose of which is that: the step (b2) can further fill the relatively wider opened fracture, however, for the wider opened fracture which has relatively larger volume and cannot be fully filled at all, it will be finally filled at a portion thereof adjacent to the well by means of "recovery filling", so as to block the fracture and control the water. Therefore, if the injection rate of the filling liquid in the step (b2) is set to be too high, the fluid velocity in the fracture is also too high, the blocker particles will be flushed into farther positions in the fracture, while the fluid velocity in the fracture after launching of production is too low, the blocker particles at the remote end may not be recovered to the vicinity of the annular space; in contrast, if the fluid velocity in the fracture after launching of production is greater than the fluid velocity during filling, most or nearly all of the blocker particles can be recovered to the vicinity of the annular space, thereby causing a better "recovery filling" effect.

In the step (b2), full filling of the blocker particles in the annular space can be determined as follows: when the filling liquid is injected at a constant rate, continuously measuring the pressure in the well until the pressure in the well increases to a set pressure, then determining that the annular space is fully filled with the blocker particles; or when the filling liquid is injected at a constant pressure, continuously measuring the flow rate of the filling liquid until the flow rate decreases to a set flow rate, then determining that the annular space is fully filled with the blocker particles. The set pressure is preferably 3-5 times as big as the filling pressure and the set flow rate is preferably one third to one fifth of the filling flow rate. Because the blocker particles are preferentially filled into the fractures, there may be relatively larger fractures which are not fully filled, so that the annular space is not fully filled, then the termination condition is set as reaching the preset filling amount of blocker particles.

The filling liquid, the parameters of the blocker particles, and those steps not specifically described in the present embodiment are identical to those in embodiment 1.

According to the technical solution provided by the present embodiment, firstly, as the annular space is also completely filled, the blocker particles in the fractures can be effectively prevented from flowing back into the annular space, which otherwise would increase the flow conductivity of the fractures and decrease the water control effect; secondly, the influence of the blocker particles on the operation of the electric pump can be avoided; thirdly, the blocker particles can be prevented from depositing in the ground tubing to influence the transfusion of the ground tubing; fourthly, the blocker particles can enter the fractures with a width smaller than the particle size of the particles, so that the blocking capability of the blocker particles on the fractures is improved; fifthly, by recovery filling, a better fracture blocking effect can be obtained on the premise of using less blocker particles.

Embodiment 3

Embodiment 3 is a further optimization of embodiment 2. The technical solution described in connection with embodiment 2 has the following problems: firstly, after the fractures are filled with the blocker particles, although the flow conductivity is greatly reduced compared with that before filling, the permeability of the fractures is still higher than that of the matrix (by several times to hundreds times) relative to the matrix, and certain water is still produced, and the water production of the fractures needs to be further reduced; secondly, along the production section of the wellbore, water is produced for a plurality of reasons, some of the water is produced by local high-permeability matrix, and it is not very ideal to perform water control only in the fractures.

Figure 4:
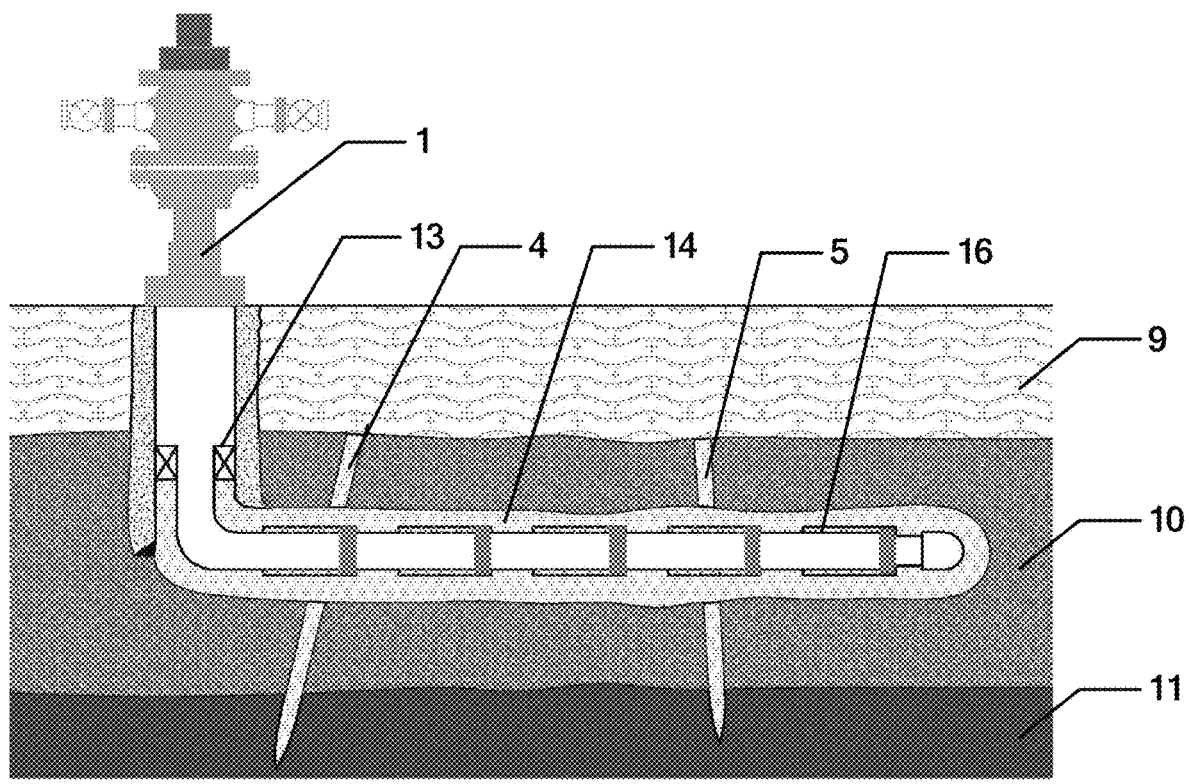
FIG. 4 is a structural schematic illustration of the oil-gas well of the fractured oil-gas reservoir shown in FIG. 1 after its fractures and annular space are filled by the method for filling an oil-gas well of a fractured oil-gas reservoir with blocker particles to reduce water and increase oil production described in embodiment 3.

In this regard, embodiment 3 uses a water control sieve tube to further improve water control capability. As shown in FIG. 4, the present embodiment differs from embodiment 2 only in that the sieve tube used in the present embodiment is a water control sieve tube, and others are the same as embodiment 2.

The method realizes dual water control functions, one is water control in the fractures and the other is water control in the wellbore (the water control effect is realized by the combined action of the continuous blocker and the water control sieve tube in the wellbore). The dual water control is advantageous in that: firstly, under the combined water control action of the water control sieve tube and the continuous blocker in the wellbore, water seepage from the fractures can be further reduced; secondly, the annular space of the wellbore is fully filled with the continuous blocker, preventing the blocker particles in the fractures from being brought out by the fluid in the fractures in a large amount, thereby ensuring the blocking effect of the fractures; thirdly, in the process of recovery, the blocker particles is brought from the fractures back to the annular space, improving accumulation compactness of the blocker particles in the annular space, so that the technical solution of "annular space blocker particles plus water control sieve tube" of this embodiment can obtain better water control effect. On the other hand, the dual water control also has a better water control effect on the high-permeability matrix near the production section of the wellbore, thereby realizing synergistic effect.

Embodiment 4

The present embodiment provides a method for filling an oil-gas well of a fractured oil-gas reservoir with blocker particles to reduce water and increase oil production, which is suitable for an application scene with both a production well and a water injection well. The oil-gas well comprises one or more production wells and one or more water injection wells cooperating with the production wells. The method comprises the following steps: (c1) continuously injecting a filling liquid carrying blocker particles into a wellbore of a water injection well and a fracture via a wellhead of the water injection well until a preset filling amount of blocker particles is reached; (c2) launching production of the production well or starting normal production.

The principle of the method is as follows: for certain fractured oil-gas reservoirs, liquid production can be significantly improved by providing a water injection well to inject water into an oil zone. However, for fractured oil-gas reservoirs, due to the presence of fractures, the injected water may directly pass to the production well through the fractures, so that oil in the matrix cannot be effectively displaced; particularly seriously, some fracture networks directly communicate the water injection well with the production well, so that water is directly guided from the water injection well to the production well, is difficult to permeate into the matrix. With the method of the present embodiment, the water injection well having fractures is injected with water, and simultaneously blocker particles of certain concentration and quantity are mixed in the water, so that the fractures communicated with the water injection well can be blocked, facilitating permeation of the injected water into the matrix and improving the oil-gas exploitation efficiency.

Preferably, in order to prevent the blocker particles injected from the water injection well from directly flowing to the production well along the fractures and affecting the pump body in the production well, the production section of the production well is of a structure provided with a sieve tube or a water control sieve tube, so that the blocker in the production well is isolated by the sieve tube or the water control sieve tube. For a production well with a sieve tube or water control sieve tube, the technical effects described in connection with embodiments 2 and 3 can also be achieved if the annular space and the fractures adjacent to the well can be fully filled by the present method. Specifically, the blocker particles are of a spherical structure, the particle size is 0.05-5 mm, and the density is 0.7-1.4 gram/cm$^3$ (true density), and the material is polyethylene, high-density polyethylene, polypropylene, polyvinyl chloride or styrene divinylbenzene crosslinked copolymer; the concentration of the blocker particles in water is 1-10% (by volume); the injection amount of the blocker particles should meet the requirements of the volume of the annular space of the production well, the volume of the fractures (or the volume of the fractures adjacent to the production well) and the loss along the way between the production well, and the blocker particles can be gradually added into the injected water according to the water control effect of the production well (the water control effect can be dynamically monitored and determined from variation trend of the water content of the produced liquid).

The technical solution provided by the present embodiment is advantageous in that: firstly, the operation cost is low, and the blocker particles can be directly added in the injected water of the water injection well; secondly, compared with the technical solution of directly filling in the production well, the step of providing a specialized filling pump in the production well is avoided, so that the normal production of the production well is not interfered, further improving the production efficiency; thirdly, the water content of the produced liquid can be effectively reduced and the oil production can be improved.

Embodiment 5

Prior art technology of controlling water by continuous blocker in the wellbore also adopts a step of filling the annular space with the blocker particles. However, such technology can only fully fill fractures having an opening communicated with a small volume, and cannot effectively fully fill closed fractures, blind fractures and infinite fractures, wherein, "closed fracture" refers to a fracture having an opening at the well wall which is too narrow and "blind fracture" refers to a fracture having no opening at the well wall at all and particles cannot enter at all; "infinite fracture" refers to a fracture having an opening at the well wall which is very wide and communicating with fracture(s) which is/are very far away and has/have huge volume and the blocker particles can flow along with filling liquid to a position far away from the wellbore during filling and cannot stay at a position adjacent to the well, so that the position adjacent to the well cannot be fully filled. Full filling of the infinite fracture is too costly to implement. The infinite fracture also leads to a problem that the annular space cannot be fully filled, because under the condition that the fractures exist, the particles preferentially flow to the fractures, and the annular space cannot be filled until the fractures are fully filled, and if the fractures are not fully filled, the annular space cannot be fully filled. At this time, if the annular space is not fully filled, the water control function of the wellbore blocker fails completely or to some extent. These three types of fractures are also important means for water channeling, and are urgently required to be filled and blocked by blocker particles. On the other hand, due to the blind fractures, water can flow almost unimpededly from a position far away from the wellbore to an end of the fracture adjacent to the wellbore and then seep through a short length of the matrix to the wellbore, thereby causing a very serious problem of water channeling.

For a near-well closed fracture, the technical solutions shown in embodiments 1 to 4 may be adopted, and with a filling pressure reaching or exceeding the stratum crack/fracture extension pressure, the wellbore and the fractures, or the annular space and the fractures, are filled with a certain volume of blocker particles through the filling liquid. Preferably, a volume of the blocker particles being injected is 1 to 12 times as big as that of the annular space.

Regarding near-well infinite fractures, some near-well blind fractures and some closed fractures, the present embodiment provides a method for filling an oil-gas well of a fractured oil-gas reservoir with blocker particles to reduce water and increase oil production, which can allow the blocker particles filled into the fractures and located a certain distance from the wellbore to be collected into a production well through recovery, realizing a recovery filling, and comprises the following specific implementation steps: (d1) injecting a filling liquid carrying blocker particles into a wellbore and a fracture via a wellhead; (d2) launching production, wherein an injection rate of the filling liquid in the step (d1) is smaller than a liquid producing rate after the production is launched in the step (d2). By setting the injection rate of the filling liquid to be smaller than the liquid producing rate, the blocker particles in the fractures can be prevented from being brought too far away by the filling liquid, ensuring that most of the blocker particles can be recovered and filled into the annular space and the near-well fractures in the recovery process. During recovery filling, the blind fractures and the closed fractures can receive blocker particles through a fracture communicating network within the stratum, and can be fully filled or partially filled. Preferably, a volume of the blocker particles being injected is 1 to 12 times as big as that of the annular space.

Preferably, the step (d2) further comprises the following step before launching the production: extracting liquid from the wellbore by a pump disposed in the wellbore, wherein a rate at which the liquid is extracted by the pump is greater than an injection rate of the filling liquid, and a volume of the liquid being extracted is greater than a volume of the filling liquid being injected; or producing the liquid in the wellbore by an artificial lifting method, wherein a liquid producing rate is greater than an injection rate of the filling liquid, and a volume of the liquid being produced is greater than a volume of the filling liquid being injected. The purpose of rapidly extracting or producing liquid in the wellbore through pumping or otherwise through artificial lifting method is to further improve the recovery flow rate of the blocker particles in the fractures adjacent to the wellbore, improve recovery ratio and increase compactness of the recovered particles. For a flowing well, a recovery rate greater than the filling rate can be achieved by increasing the production of the flowing well.

The method is not only suitable for general oil-gas wells, but also can be better suitable for oil-gas wells provided with a sieve tube or a water control sieve tube. The sieve tube is provided in the wellbore, the sieve tube can be a water control sieve tube. A packing device is provided at the top of the sieve tube. The packing device is provided with a filling channel for injecting filling liquid. The filling liquid is injected into the annular space and the fracture through the filling channel provided on the packing device.

The parameters of the filling liquid, the blocker particles, and the like used in the present embodiment are identical to those of embodiment 1.

Embodiment 6

The present embodiment provides a practical application of the technical solution described in embodiment 1.

An oil-gas well of a fractured oil-gas reservoir is located in a hard fractured sandstone stratum, the matrix permeability is 0.1 Darcy, and the measured initial fracture extension pressure is 10 MPa. The horizontal section of the wellbore is 400 meters long and the wellbore diameter is 8.5 inches, with a volume of the blocker particles to be filled is expected to be 15 m$^3$. Production is directly launched, and the daily oil yield is 30 m$^3$, and the water content of the produced liquid is 80%. The technical solution of the embodiment 1 is used for filling fractures. Spherical blocker particles with a particle size of 0.1 mm are used in the construction process, the material is polyethylene, the density is 0.9 gram/cm$^3$, the filling amount is 12 m$^3$, the filling liquid is the produced water of a production well, the concentration of the filling liquid is 3%, the (maximum) filling pressure is 12 MPa. The injection flow rate at the same filling pressure is reduced by one fifth when the filling is finished. After filling is finished, the daily oil yield is 56 m$^3$/day, and the water content of the produced liquid is 63%.

Embodiment 7

The present embodiment provides a practical application of the technical solution described in embodiment 2.

An oil-gas well of a fractured oil-gas reservoir is located in a limestone stratum. The matrix permeability is 0.2 Darcy, and the measured initial fracture extension pressure is 20 MPa. The horizontal section of the wellbore is 300 meters long and the wellbore diameter is 8.5 inches. A 5.5-inch composite sand prevention tube is deployed. The volume of the annular space is 5 m$^3$. Production is directly launched, and the daily oil yield is 5 m$^3$, and the water content of the produced liquid is 89%. The technical solution of the embodiment 2 is used for filling the annular space and the fractures. Spherical blocker particles with a particle size of 0.3 mm are used in the construction process, the material is polyvinyl chloride, the density is 1.4 gram/cm$^3$, the filling liquid is seawater, and the concentration of the filling liquid is 5%. In the first stage, the (maximum) filling pressure is 25 MPa and the filling amount of the blocker particles is 10 m$^3$. In the second stage, the (maximum) filling pressure is 5 MPa and the filling amount of the blocker particles is 4 m$^3$. The injection flow rate at the same filling pressure is reduced by one fifth when the filling is finished. The production is launched after filling is finished, the daily oil yield is 23 m$^3$/day, and the water content of the produced liquid is 50%.

Embodiment 8

The present embodiment provides a practical application of the technical solution described in embodiment 3.

An oil-gas well of a fractured oil-gas reservoir is located in a biohermal limestone stratum in which a large number of stress fractures and dissolution fractures exist and a large number of widely opened fractures exist. The matrix permeability is 1 Darcy, and the measured initial fracture extension pressure is 15 MPa. The horizontal section of the wellbore is 700 meters long and the wellbore diameter is 8.5 inches. A 5.5-inch water control sieve tube is deployed. The volume of the annular space is 9.4 m$^3$. Production is directly launched, and the daily oil yield is 11 m$^3$, and the water content of the produced liquid is 95%. The technical solution of the embodiment 3 is used for filling the annular space and the fractures. Spherical blocker particles with a particle size of 0.2 mm are used in the construction process, the material is styrene divinylbenzene crosslinked copolymer, the density is 1.05 gram/cm$^3$, the filling amount is 27 m$^3$, the filling liquid is seawater, and the concentration of the filling liquid is 2%. In the first stage, the (maximum) filling pressure is 18 MPa, and the filling amount is 5 m$^3$. In the second stage, the (maximum) filling pressure is 10 MPa, and is gradually reduced to 2 MPa, and the filling amount is 22 m$^3$. At that moment, the preset filling amount of blocker particles of 27 m$^3$ is reached but the annular space is not fully filled, and the filling is finished. In this embodiment, the preset liquid production rate of the oil well is 110 m$^3$/day. Therefore, for the 22 m$^3$ of blocker particles filled in the second stage, the filling rate of the filling liquid carrying the first 2 m$^3$ of blocker particles is more than 80 m$^3$/day, and the filling rate of the filling liquid carrying the last 20 m$^3$ of blocker particles is controlled to be smaller than 80 m$^3$/day (smaller than the preset liquid production rate of 110 m$^3$/day). As such, it can be ensured that most of the 20 m$^3$ of blocker particles filled in the fractures can be recovered and filled after the oil well is in production. The production is launched after filling is finished, the daily oil yield is 100 m$^3$/day, and the water content of the produced liquid is 10%.

Embodiment 9

The present embodiment provides a practical application of the technical solution described in embodiment 4.

An oil-gas well of a fractured oil-gas reservoir is located in a stratum with a large number of wide dissolution fractures. The matrix permeability is 0.2 Darcy, and the measured initial fracture extension pressure is 10 MPa. The horizontal section of the wellbore is 400 meters long and the wellbore diameter is 8.5 inches. The expected volume of blocker particles to be filled is 100 m$^3$. Production is directly launched, and the daily oil yield is 8 m$^3$, and the water content of the produced liquid is 87%. The technical solution of the embodiment 1 is used for filling the fractures. Spherical blocker particles with a particle size of 0.2 mm are used in the construction process, the material is polypropylene, the density is 0.9 gram/cm$^3$, the filling amount is 110 m$^3$, the filling liquid is the produced water from the wellhead of the production well, and the concentration of the filling liquid is 1%. The (maximum) filling pressure is 8 MPa. The production is launched after filling is finished, the daily oil yield of the production well is 26 m$^3$/day, and the water content of the produced liquid is 60%.

Embodiment 10

The present embodiment provides a practical application of the technical solution described in embodiment 5.

An oil-gas well of a fractured oil-gas reservoir is located in a fractured limestone stratum. The matrix permeability is 0.15 Darcy, and the measured initial fracture extension pressure is 12 MPa. The horizontal section of the wellbore is 500 meters long and the wellbore diameter is 8.5 inches. A 5.5-inch water control sieve tube is deployed. The volume of the annular space is 6.7 m$^3$. The expected volume of blocker particles to be filled is 42 m$^3$. Production is directly launched, and the daily oil yield is 15 m$^3$, and the water content of the produced liquid is 92%. The technical solution of the embodiment 5 is used for filling the fractures. Spherical blocker particles with a particle size of 0.15 mm are used in the construction process, the material is polyethylene, the density is 0.9 gram/cm$^3$, the filling amount is 42 m$^3$, the filling liquid is the produced water from the production well, and the concentration of the filling liquid is 3%. The filling flow rate is 150 m$^3$/day, the filling amount reaches 42 m$^3$, and no indication of a fully filled annular space is observed, but the expected volume of the blocker particles is reached, and therefore the filling is finished. The production is launched after filling is finished, the liquid production is 375 m³/day which is larger than the filling flow rate. The daily oil yield is 300 m³/day, and the water content of the produced liquid is 20%.

The foregoing is a further detailed description of the present invention in connection with specific preferred embodiments and it is not intended to limit the present invention to the specific embodiments as described. For example, for a fractured reservoir mainly producing gas and a fractured reservoir only producing gas, the technical solutions disclosed by the present invention are still applicable and can achieve the effects of increasing gas production and reducing water. For those skilled in the art to which the present invention pertains, numerous simple deductions or substitutions may be made without departing from the spirit of the present invention, which shall be deemed as falling into the scope of the present invention.

The invention claimed is:

1. A method for filling an oil and gas well of a fractured oil and gas reservoir with pack-off particles to reduce water and increase oil production, the oil and gas well having a wellbore within which a screen pipe is provided, wherein a packer is provided at the top of the screen pipe, and the packer is provided with a filling channel for injecting filling liquid, wherein the method comprises the following steps:
   (b1) continuously injecting a filling liquid carrying pack-off particles into an annular space and a fracture via the filling channel provided on the packer, until (i) a stratum crack/fracture extension pressure is reached or exceeded, (ii) an injection amount per unit injection pressure is close to zero, or (iii) a preset filling amount of pack-off particles is reached;
   (b2) reducing an injection rate of the filling liquid, and allowing a filling pressure to be smaller than the stratum crack/fracture extension pressure, continuously injecting the filling liquid carrying pack-off particles until the annular space is fully filled with the pack-off particles or the preset filling amount of pack-off particles is reached; and
   (b3) closing the filling channel and launching production, wherein the preset filling amount of pack-off particles is determined by:

$V \geq \rho \cdot L_0$ wherein V is the preset filling amount of pack-off particles, $L_0$ is a total length of the wellbore of the production section; and $\rho$ is a filling density, and when the oil and gas well is a horizontal well, $\rho$ has a value of 0.01-1.0 m³/m, and when the oil and gas well is a vertical well, $\rho$ has a value of 0.01-5.0 m³/m.

2. The method for filling an oil and gas well of a fractured oil and gas reservoir with pack-off particles to reduce water and increase oil production according to claim 1, wherein the screen pipe is a water control screen pipe.

3. The method for filling an oil and gas well of a fractured oil and gas reservoir with pack-off particles to reduce water and increase oil production according to claim 1, wherein the injection rate of the filling liquid in the step (b2) is smaller than a liquid producing rate after the production is launched.

4. The method for filling an oil and gas well of a fractured oil and gas reservoir with pack-off particles to reduce water and increase oil production according to claim 3, wherein a method for measuring the stratum crack/fracture extension pressure comprises the following steps:
   (s1) continuously injecting filling liquid into the wellbore via the wellhead, gradually increasing the injection rate;
   (s2) continuously measuring the pressure in the well until the pressure in the well experiences a rapid drop;
   (s3) the highest pressure value before the rapid drop occurs is the stratum crack/fracture extension pressure.

5. The method for filling an oil and gas well of a fractured oil and gas reservoir with pack-off particles to reduce water and increase oil production according to claim 1, wherein full filling of the pack-off particles in the annular space can be determined as follows:
   when the filling liquid is injected at a constant rate, continuously measuring the pressure in the well until the pressure in the well increases to a set pressure, then determining that the annular space is fully filled with the pack-off particles; or
   when the filling liquid is injected at a constant pressure, continuously measuring the flow rate of the filling liquid until the flow rate decreases to a set flow rate, then determining that the annular space is fully filled with the pack-off particles.

6. The method for filling an oil and gas well of a fractured oil and gas reservoir with pack-off particles to reduce water and increase oil production according to claim 5, wherein the pack-off particles are of a spherical structure, and a particle size of the pack-off particles is 0.05-5 mm.

7. The method for filling an oil and gas well of a fractured oil and gas reservoir with pack-off particles to reduce water and increase oil production according to claim 6, wherein a true density of the pack-off particles is 0.7-1.4 gram/cm³.

8. The method for filling an oil and gas well of a fractured oil and gas reservoir with pack-off particles to reduce water and increase oil production according to claim 7, wherein the true density of the pack-off particles is 0.9-1.08 gram/cm³.

9. The method for filling an oil and gas well of a fractured oil and gas reservoir with pack-off particles to reduce water and increase oil production according to claim 8, wherein the pack-off particles are made of polyethylene, high-density polyethylene, polypropylene, polyvinyl chloride or styrene divinylbenzene crosslinked copolymer.

10. The method for filling an oil and gas well of a fractured oil and gas reservoir with pack-off particles to reduce water and increase oil production according to claim 9, wherein a concentration of the pack-off particles in the filling liquid is 1-20% by volume.

* * * * *